J. R. SCATTERGOOD.
Assignor, by mesne assignments, of one-half interest, to G. H. KITCHEN & Co.
Gas-Lighter.
No. 8,173. Reissued April 16, 1878.
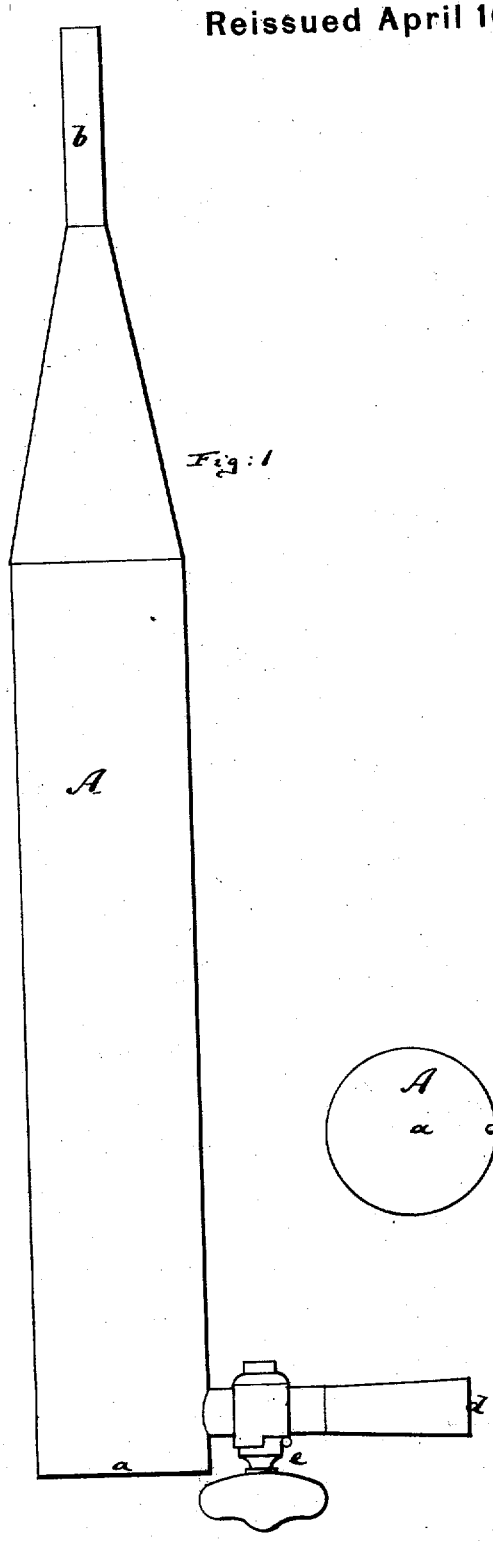
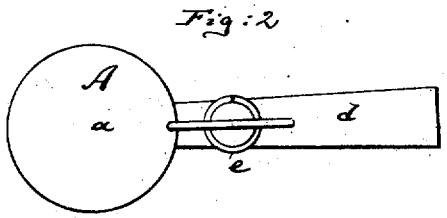
Witnesses:
J. C. Tumbridge
A. V. Briesen
Inventor:
J. R. Scattergood
by his attorney
A. V. Briesen
N. PETERS, PHOTO-LITHOGRAPHER, WASHINGTON, D. C.

UNITED STATES PATENT OFFICE.

JOHN R. SCATTERGOOD, OF NEWARK, NEW JERSEY, ASSIGNOR, BY MESNE ASSIGNMENTS, OF ONE-HALF INTEREST TO GEORGE H. KITCHEN & CO.

IMPROVEMENT IN GAS-LIGHTERS.

Specification forming part of Letters Patent No. 199,747, dated January 29, 1878; Reissue No. 8,173, dated April 16, 1878; application filed March 30, 1878.

*To all whom it may concern:*

Be it known that I, JOHN R. SCATTERGOOD, of Newark, county of Essex, and State of New Jersey, have invented a new and useful Improvement in Gas-Lighters, of which the following is a specification:

This invention relates to a new portable torch or device for lighting chandelier and other flames used in halls, parlors, and other apartments for illuminating purposes.

The invention consists in making such a torch or gas-lighter with a hollow stem or handle, with a tubular discharge-nozzle at its upper end and with an adjustable air-opening near its lower end. All the parts are so arranged that, upon connecting the discharge-nozzle by a suitable flexible tube with a gas-burner, the whole instrument may be filled with gas, which may afterward be utilized, when ignited at the outlet of the nozzle, for lighting the flames of chandeliers and the like.

In the accompanying drawings, Figure 1 represents a side view of the improved gas-lighter. Fig. 2 is an end view of the same.

A is a tube, made of sheet metal or other suitable material, of conical or other suitable shape, and of proper length for the purpose for which it is intended. This tube is closed at the lower part, as shown at *a* in the drawing. At the upper part the tube connects with a projecting discharge-nozzle, *b*, indicated in Fig. 1. Near the lower end the tube has an air-opening, *d*, which can be more or less opened or closed by means of an adjustable cock, *e*. Thus constructed, the instrument is complete, and constitutes a receptacle for gas, which, when ignited at the end of the nozzle *b*, may be used to ignite a large number of gas or other flames.

To prepare the instrument for use, the nozzle *b* is to be connected with a gas burner or tube by means of a flexible pipe or otherwise, so that the gas from the burner may flow into the tube A. The opening *d*, meanwhile, must be partly opened, so that the air may escape at the lower part of the instrument as it is being crowded out by the gas that flows in at the upper part. When the tube A is entirely or sufficiently filled with gas, the opening *d* may be entirely closed by means of the cock *e* until it is desired to use the instrument for the lighting of flames. To do this the cock or valve *e* is partly opened, so as to admit air into the lower part of the tube.

The gas, being lighter than the air, will naturally seek to escape at the open end of the nozzle *b* as soon as there is an air-inlet at the lower part of the tube A. Therefore it is only necessary to ignite the outflowing gas at the end of the nozzle *b* to bring the instrument into actual condition for use. The gas will keep the flame on the nozzle properly supplied according to the capacity of the tube A.

The device will be found very light and inexpensive, quite safe and clean, so that it can be profitably used in every house. It is far superior, as regards cleanliness and simplicity of construction, to the gas-lighting apparatus now used with wicks, tapers, or oil-reservoirs. It is not liable to get out of order, and very economical. If, in lighting a series of flames, the gas contained in the tube A has not all been exhausted, it is not wasted, provided the attendant closes the opening *d* and reverses the instrument so as to bring the nozzle downward. The light gas will then be unable to escape from the tube A, and will be in condition for use again as soon as the instrument is turned with the nozzle upward and the cock *e* opened.

The size of the flame on the nozzle, when the same is used for lighting purposes, can be regulated by means of the cock *e*, and can be made large enough to make it quite convenient to carry a lighted instrument about the house.

I claim—

1. The tube A, provided with the nozzle *b* and air-opening *d* at or near opposite ends, to constitute a gas-lighter of which the flame is supplied by gas, substantially as specified.

2. The combination of the tube A, having the nozzle *b* at one end and the air-opening *d* at or near the other end, with the cock *e*, substantially as and for the purpose specified.

JNO. R. SCATTERGOOD.

Witnesses:

L. F. MERGOTT,

JAMES GILLIN.